(12) United States Patent
Kummer et al.

(10) Patent No.: US 8,262,985 B2
(45) Date of Patent: Sep. 11, 2012

(54) SMELTING OR REDUCTION FURNACE, IN PARTICULAR ELECTRIC ARC FURNACE WITH AN OPEN, SEMI-CLOSED OR CLOSED CONFIGURATION

(75) Inventors: Karl-Heinz Kummer, Duisburg (DE); Dieter Borgwardt, Dorsten (DE)

(73) Assignee: SMS Siemag Aktiengesellschaft, Düsseldorf (DE)

( * ) Notice: Subject to any disclaimer, the term of this patent is extended or adjusted under 35 U.S.C. 154(b) by 459 days.

(21) Appl. No.: 11/921,817

(22) PCT Filed: Jun. 9, 2006

(86) PCT No.: PCT/EP2006/005524
§ 371 (c)(1),
(2), (4) Date: Dec. 7, 2007

(87) PCT Pub. No.: WO2006/131384
PCT Pub. Date: Dec. 14, 2006

(65) Prior Publication Data
US 2009/0230600 A1    Sep. 17, 2009

(30) Foreign Application Priority Data
Jun. 9, 2005    (DE) .......................... 10 2005 026 627

(51) Int. Cl.
*C21C 7/00*    (2006.01)

(52) U.S. Cl. ........................................ 266/216; 266/268
(58) Field of Classification Search .................. 266/216, 266/225, 268; 373/79, 80, 81
See application file for complete search history.

(56) References Cited

U.S. PATENT DOCUMENTS

| | | | | |
|---|---|---|---|---|
| 2,727,937 A | * | 12/1955 | Boyer | 373/81 |
| 3,010,610 A | * | 11/1961 | Marshall et al. | 222/1 |
| 4,435,815 A | * | 3/1984 | Evensen | 373/81 |
| 4,836,115 A | * | 6/1989 | MacArthur | 110/234 |

FOREIGN PATENT DOCUMENTS

DE    32 15 119    11/1982

OTHER PUBLICATIONS

Patent Abstracts of Japan, BD. 002, No. 030, (M-010), Feb. 24, 1978 & JP 52 145965 A (Sumitomo Metal Ind Ltd), Dec. 5, 1977.

* cited by examiner

*Primary Examiner* — Scott Kastler
(74) *Attorney, Agent, or Firm* — Lucas & Mercanti, LLP; Klaus P. Stoffel

(57) ABSTRACT

The invention relates to a melting or reduction furnace (2), in which the charge stock (9) is supplied using feed pipes (17). Each feed pipe (17) has a mouthpiece (18) that is not cooled and is configured from an uncooled wear-resistant inner guide pipe (19) and an uncooled concentric, heat-resistant outer protective pipe (20).

5 Claims, 2 Drawing Sheets

SMELTING OR REDUCTION FURNACE, IN PARTICULAR ELECTRIC ARC FURNACE WITH AN OPEN, SEMI-CLOSED OR CLOSED CONFIGURATION

The invention concerns a smelting or reduction furnace, especially an electric arc furnace, with an open, semiclosed, or closed configuration, to which the charge material in solid form is charged through charging tubes, which are guided into the furnace chamber, possibly through a fume hood or an upper furnace portion constructed as a furnace roof.

Charging tubes that are presently in use consist of two tubes of suitably large diameter and of helical cooling pipes installed between them. The complicated production technology involved in the production of these helical pipes alone makes this prior-art technology rather uneconomical. A much more important consideration is the experience that the cooling pipes become leaky and allow cooling water to get into the furnace. Leaks of this sort are caused by the sharp-edged burden, which results in a great deal of wear and unavoidable leakage of water. The penetration of water into the furnace chamber produces an explosion risk.

DE 32 15 119 A1 discloses means of reducing cooling problems and creating a charging tube of longer service life and greater operating reliability in cases in which the charging tubes are exposed to extreme furnace heat. To this end, it is disclosed that a charging tube is lowered vertically into the furnace chamber and then lifted back out after completion of the charging operation. The charging tube consists of two telescopically arranged tube sections. The tube is filled with the charge material in its raised position, in which the discharge opening at the lower end of the tube is also closed. The tube is lowered only to carry out the actual charge operation. The tube is lowered very quickly to increase the downward acceleration of the charge material. In this way, the charging tube is located for the greatest possible time in a protected position in which it is not exposed to the direct heat of the furnace. This design requires a great deal of expense with respect to capital investment, material, control systems, and electrical equipment, which must be installed above the hot furnace in areas that once again require cooling.

The objective of the invention is to avoid the penetration of water into the area of the furnace and, if possible, to prevent it altogether.

In accordance with the invention, the solution to this problem is characterized by the fact that each charging tube has a mouthpiece, which is uncooled and consists of an uncooled, wear-resistant inner feed tube and an uncooled, concentric, heat-resistant outer protective tube. This eliminates the possibility that a situation could arise in which there is a risk of explosion due to the penetration of cooling water into the furnace chamber. In addition, the welding work that was formerly required for the helical cooling pipes is eliminated, because these cooling pipes are no longer necessary. The service life of charging tubes of this type has been found to be sufficient and economical.

In one embodiment of the invention, the material for the wear-resistant inner feed tube consists of austenitic manganese steel or a manganese alloy in order to avoid heating by induced currents.

It is also proposed that the material for the heat-resistant outer protective tube should consist of high-temperature chromium-nickel steel.

In another embodiment, the wear-resistant inner feed tube with an outside diameter of about 500-600 mm is inserted with an air gap into the heat-resistant outer protective tube with an outside diameter of about 560-660 mm.

This air gap is at least 10 mm and constitutes further thermal insulation from the outside to the inside, which further increases the service life.

A specific embodiment of the invention is illustrated in the drawings and described in detail below.

Figure 1:
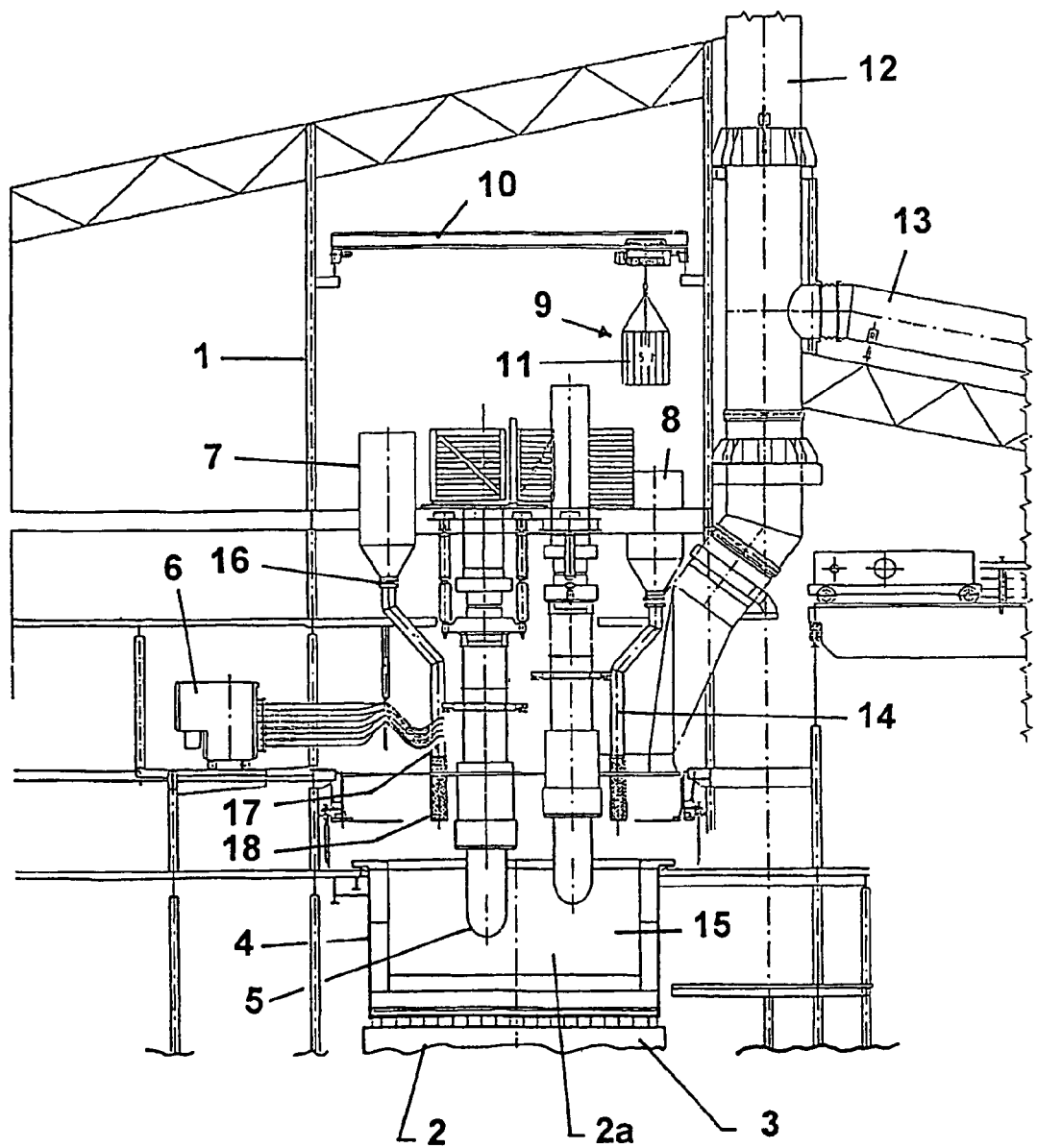
FIG. 1 shows a cross section through the largest part of an electric arc furnace installation.

A reduction furnace 2, for example, an electric arc furnace 2a, is installed in a hall frame 1 (FIG. 1). The reduction furnace 2 consists of a lower furnace 3, which is the part of the furnace in which the actual melting takes place, and an upper furnace 4. The reduction furnace 2 can have various designs with an open, semiclosed, or closed configuration. Electrodes 5 are located in the center and can be raised and lowered to adjust their distance from the charge material that is to be melted (e.g., scrap). Power is supplied through transformers 6, which are laterally installed in the hall frame 1. Charging bins 7, 8, etc., are installed around the electrodes 5 and are filled with charge material 9 (e.g., prepared ore burden) by a hall crane 10 and a charging bucket 11. Exhaust gases from the process are removed from the upper furnace 4 and fed to an energy recovery plant (not shown) after dust extraction and separation into different waste gas lines 12 and 13.

The charge material 9 conveyed by the hall crane 10 is dumped into the charging bins 7 and 8, several of which are distributed over the cross section of the furnace. After a valve 16 has been opened, the charge material 9 moves along the charging path 14 into a charging tube 17, which operates only with its mouthpiece 18 in the hot region of the furnace, the furnace chamber 15.

Figure 2:
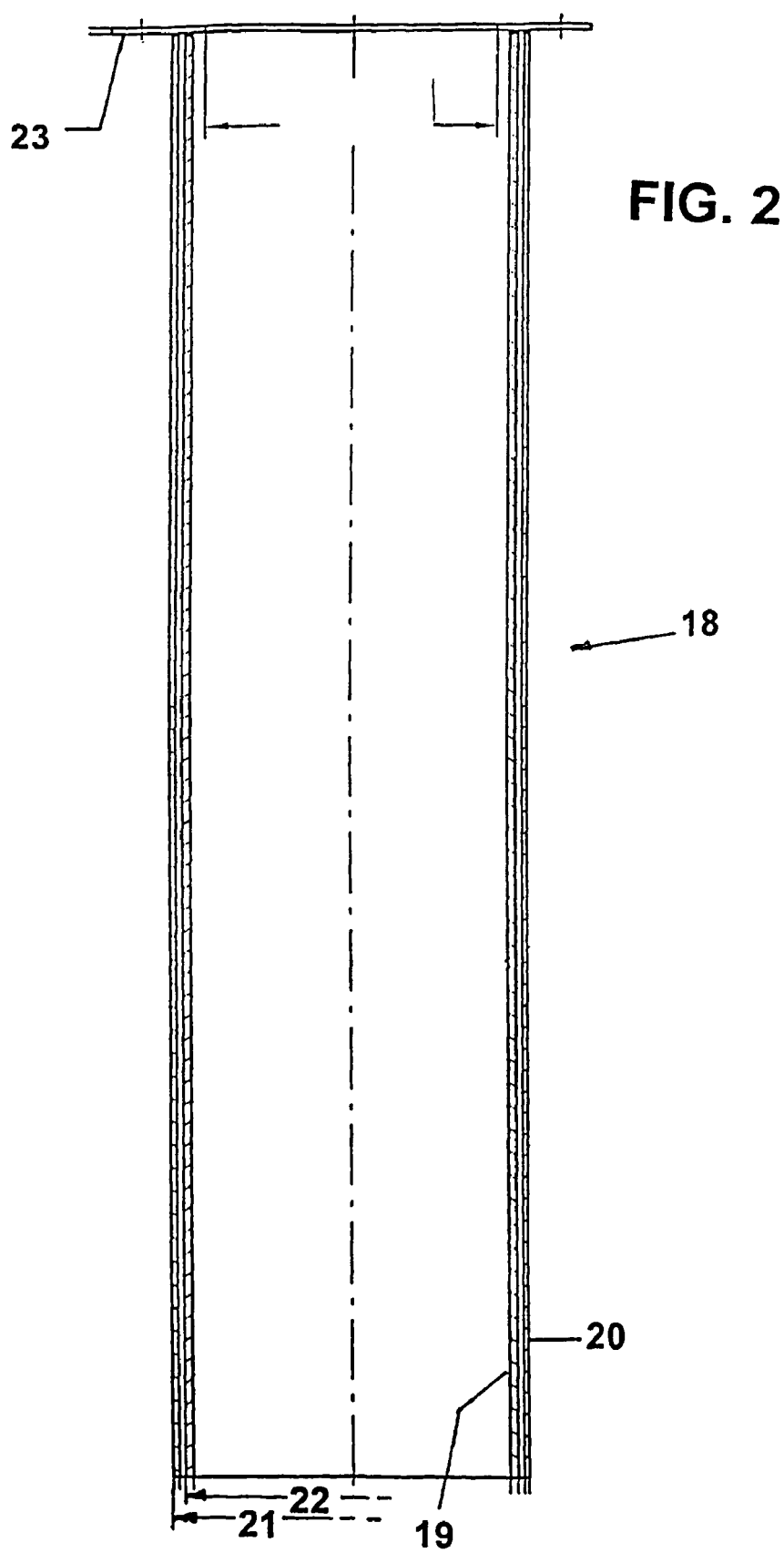
FIG. 2 shows an axial longitudinal section through the mouthpiece of the charging tube.

In the illustrated embodiment (FIG. 2), the mouthpiece 18 of the charging tube 17 consists of two tubes, namely, an outer protective tube 20 and an inner feed tube 19, which is arranged concentrically in the outer protective tube 20.

The inner feed tube 19 is made of wear-resistant material (e.g., austenitic manganese steel or a manganese alloy so as to avoid heating by induced currents), and the outer protective tube 20 is made of heat-resistant material (e.g., high-temperature chromium-nickel steel). Various production methods can be used to make the inner feed tube 19 and the outer protective tube 20. The tubes have diameters on the order of about 540 mm outside diameter 22 for the wear-resistant inner feed tube 19 and about 576 mm outside diameter 21 for the heat-resistant outer protective tube 20. The inner feed tube 19 and the outer protective tube 20 are held together to form a uniform mouthpiece 18 by a movable flange 23 (and spacers distributed over the length).

LIST OF REFERENCE NUMBERS 1 hall frame
2 smelting or reduction furnace
2a electric arc furnace
3 lower furnace
4 upper furnace
5 electrodes
6 transformers
7 charging bin
8 charging bin
9 charge material
10 hall crane
11 charging bucket
12 waste gas line
13 waste gas branch line
14 charge material 15 furnace chamber
16 valve
17 charging tube
18 mouthpiece
19 inner feed tube
20 outer protective tube
21 outside diameter of the outer protective tube 20
22 outside diameter of the inner feed tube 19
23 movable flange with spacers

The invention claimed is:

1. A smelting or reduction furnace (2) with an open, semi-closed, or closed configuration, to which charge material (9) in solid form is charged to a furnace chamber (15) through charging tubes (17), wherein each charging tube (17) has a mouthpiece (18), which is uncooled and consists of an uncooled, wear-resistant inner feed tube (19) and an uncooled, concentric, heat-resistant outer protective tube (20), the inner feed tube being concentrically arranged in the outer protective tube, and further comprising a flange fixed to an upper end of the inner tube and to an upper end of the outer protective tube so that the inner tube is fixed relative to the outer tube and the mouthpiece is unitary.

2. A smelting or reduction furnace in accordance with claim 1, wherein the material for the wear-resistant inner feed tube (19) consists of austenitic manganese steel or a manganese alloy so as to avoid heating by induced currents.

3. A smelting or reduction furnace in accordance with claim 1, wherein the material for the heat-resistant outer protective tube (20) consists of high-temperature chromium-nickel steel.

4. A smelting or reduction furnace in accordance with claim 1, wherein the wear-resistant inner feed tube (19) with an outside diameter (22) of about 500-600 mm is inserted with an air gap into the heat-resistant outer protective tube (20) with an outside diameter (21) of about 560-660 mm.

5. A smelting or reduction furnace in accordance with claim 4, wherein the air gap is at least 10 mm.

* * * * *